(12) United States Patent
Walker Pina et al.

(10) Patent No.: US 7,836,487 B2
(45) Date of Patent: Nov. 16, 2010

(54) APPARATUS AND METHOD FOR AUTHENTICATING A USER WHEN ACCESSING TO MULTIMEDIA SERVICES

(75) Inventors: John Michael Walker Pina, Madrid (ES); Juan Antonio Sanchez Herrero, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 493 days.

(21) Appl. No.: 10/595,110

(22) PCT Filed: Aug. 26, 2003

(86) PCT No.: PCT/SE03/01316

§ 371 (c)(1),
(2), (4) Date: Feb. 6, 2007

(87) PCT Pub. No.: WO2005/020619

PCT Pub. Date: Mar. 3, 2005

(65) Prior Publication Data
US 2007/0130471 A1 Jun. 7, 2007

(51) Int. Cl.
*H04L 9/32* (2006.01)
*G06F 7/04* (2006.01)
(52) U.S. Cl. .................. 726/3; 726/5; 726/27; 726/28; 726/29; 713/168
(58) Field of Classification Search ........................ None
See application file for complete search history.

(56) References Cited

U.S. PATENT DOCUMENTS

| | | | |
|---|---|---|---|
| 6,173,406 B1 * | 1/2001 | Wang et al. | 726/3 |
| 6,609,198 B1 * | 8/2003 | Wood et al. | 713/155 |
| 2001/0031635 A1 | 10/2001 | Bharatia | |
| 2001/0049790 A1 * | 12/2001 | Faccin et al. | 713/185 |
| 2003/0159067 A1 | 8/2003 | Stirbu | |

FOREIGN PATENT DOCUMENTS

| | | |
|---|---|---|
| WO | WO 02 091785 A | 11/2002 |
| WO | WO 03056781 A | 7/2003 |

OTHER PUBLICATIONS

"Access security for IP-based services (Release 5)" $3^{rd}$ Generation Partnership Project; Technical Specification Group Services and System Aspects, [Online] pp. 1-40, XP002264085, Retrieved from the Internet: <URL:http://www.3gpp.org/ftp/specs/htm]-info/33203.htm> [retrieved on Dec. 5, 2003] section 4; section 5; section 6.1.1-6.1.2.

* cited by examiner

*Primary Examiner*—Kaveh Abrishamkar

(57) ABSTRACT

An inter-domain authentication mechanism is provided for carrying out a cross-domain authentication for a given user between an access network domain and a Multimedia domain. The authentication mechanism is applicable where a user has been authenticated by the access network and may be implemented as a dedicated Multimedia Authentication device in close co-operation with a subscriber server, or be fully integrated in the subscriber server. The authentication mechanism is arranged for re-using authentication data between different networks, or between different technological domains, and with help from other entities of a Multimedia domain according to present standards.

28 Claims, 9 Drawing Sheets

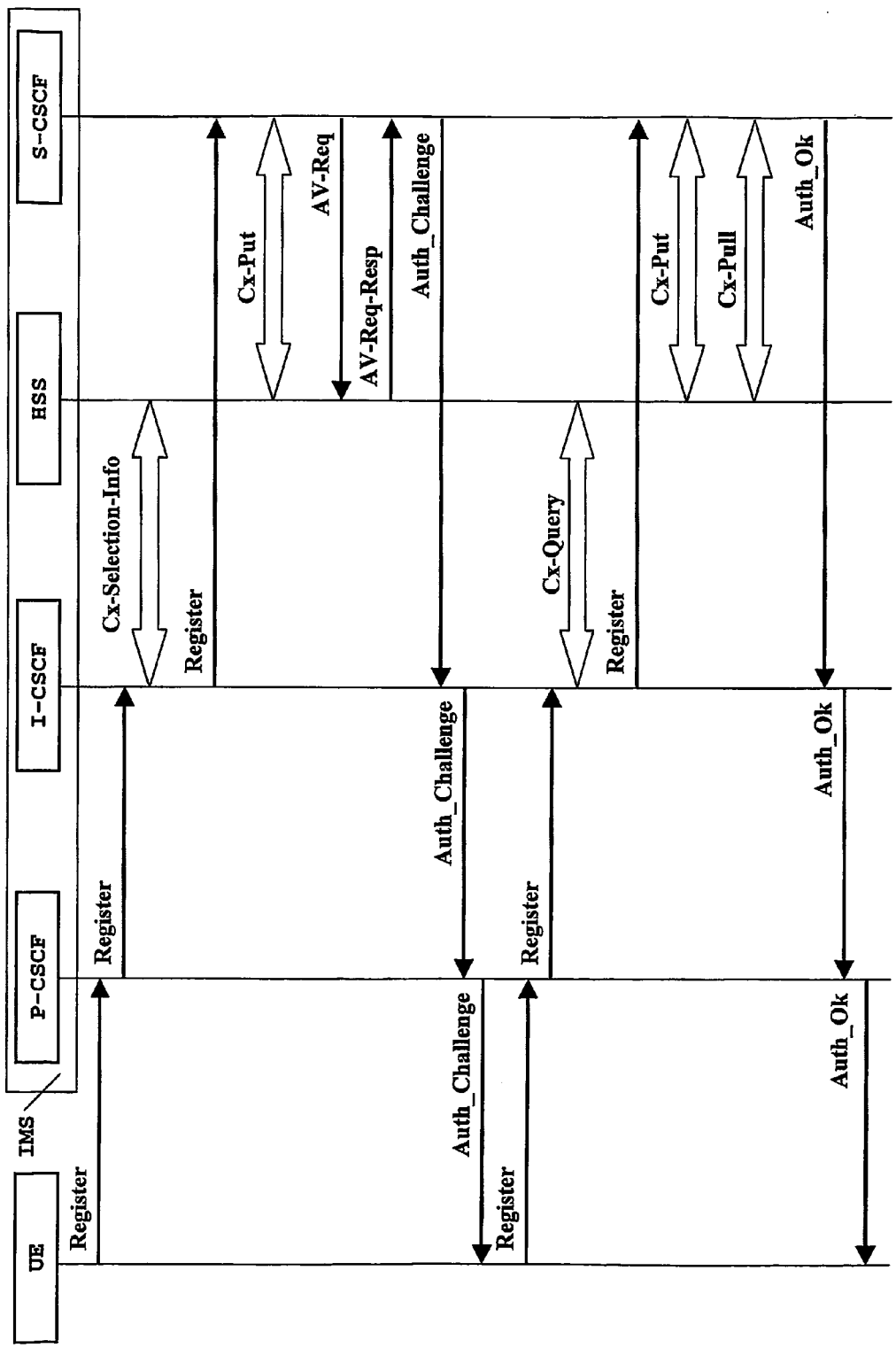
FIG. -1- State of Art

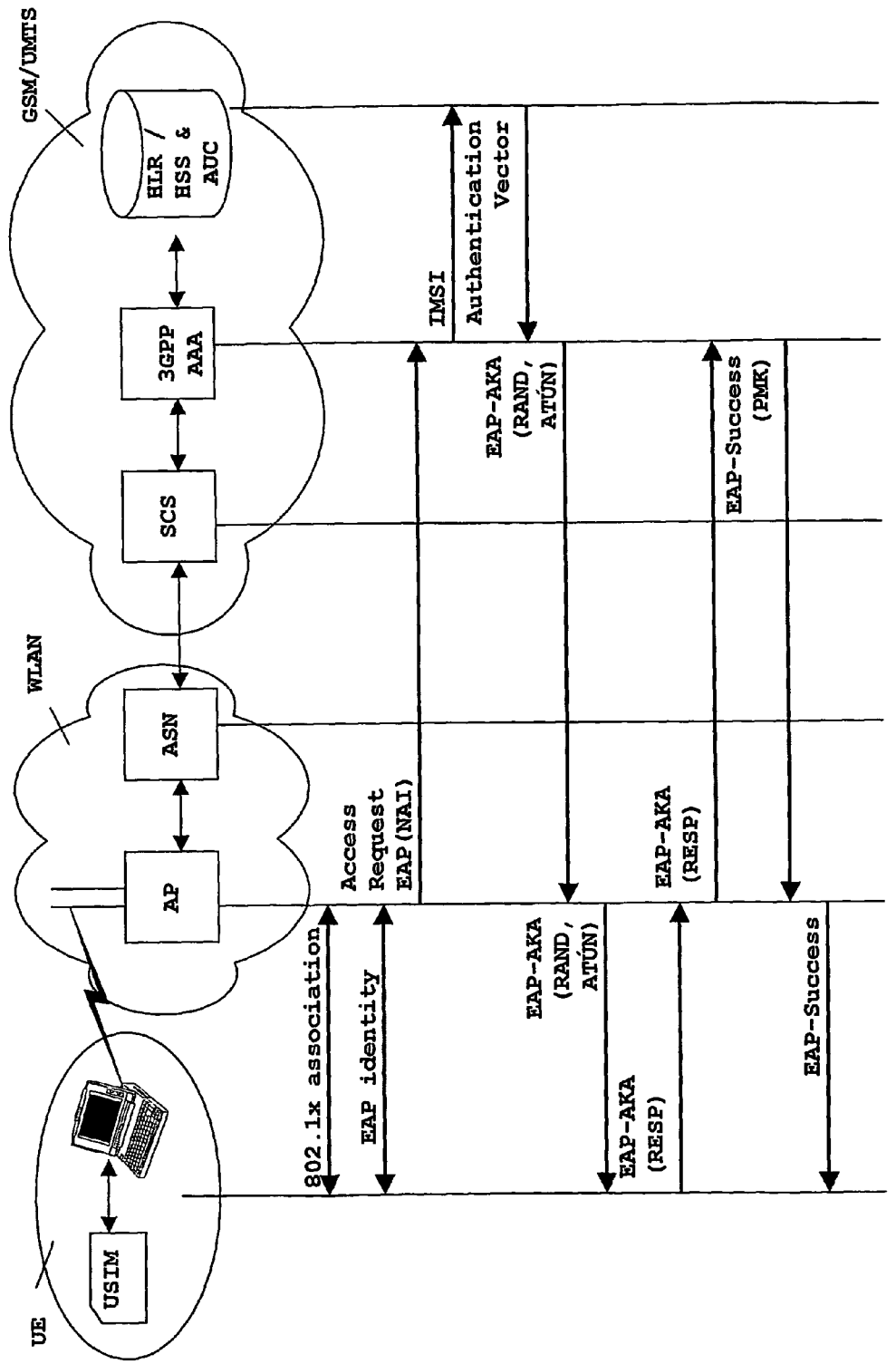
FIG.-2- State of Art

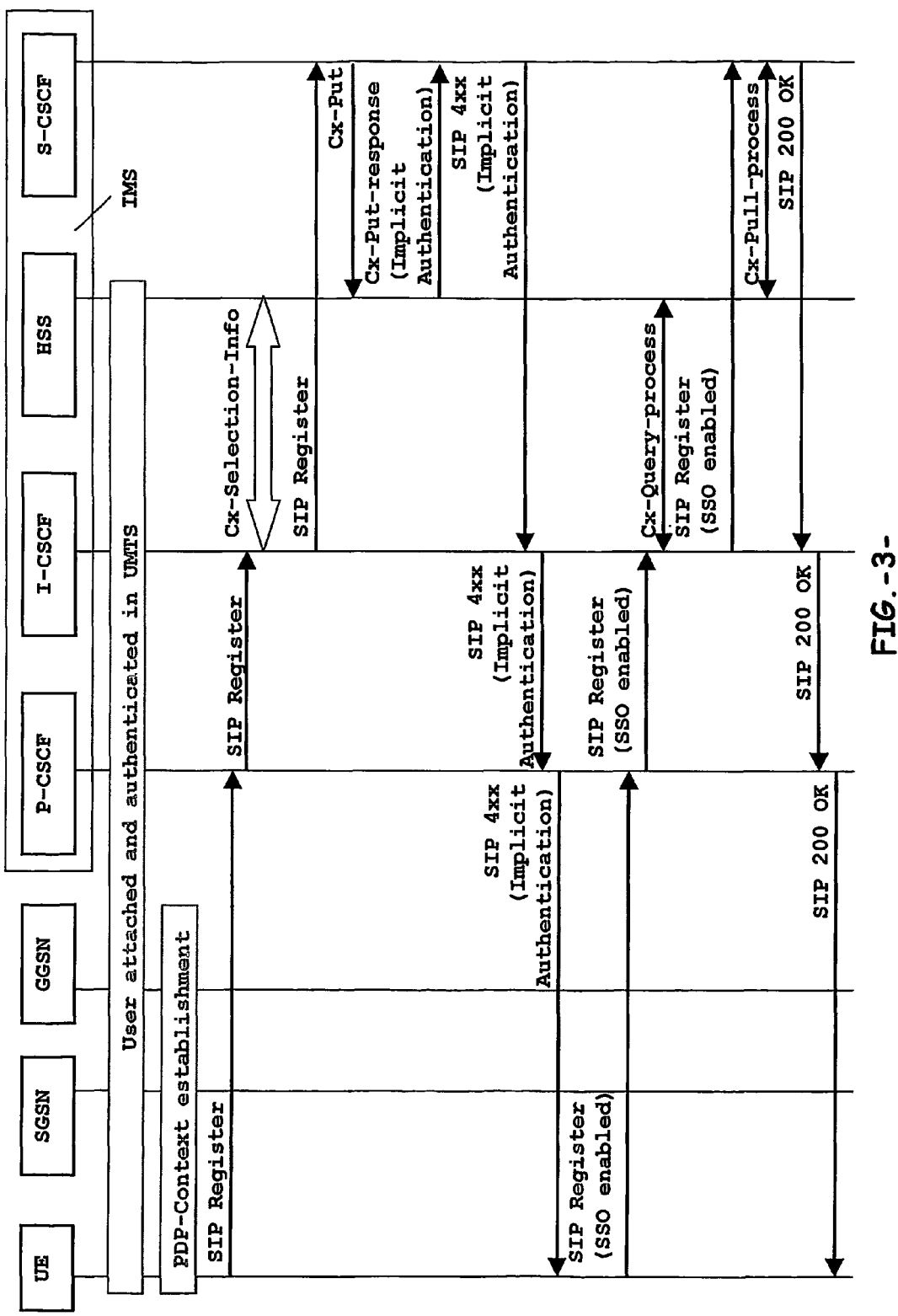
FIG. -3-

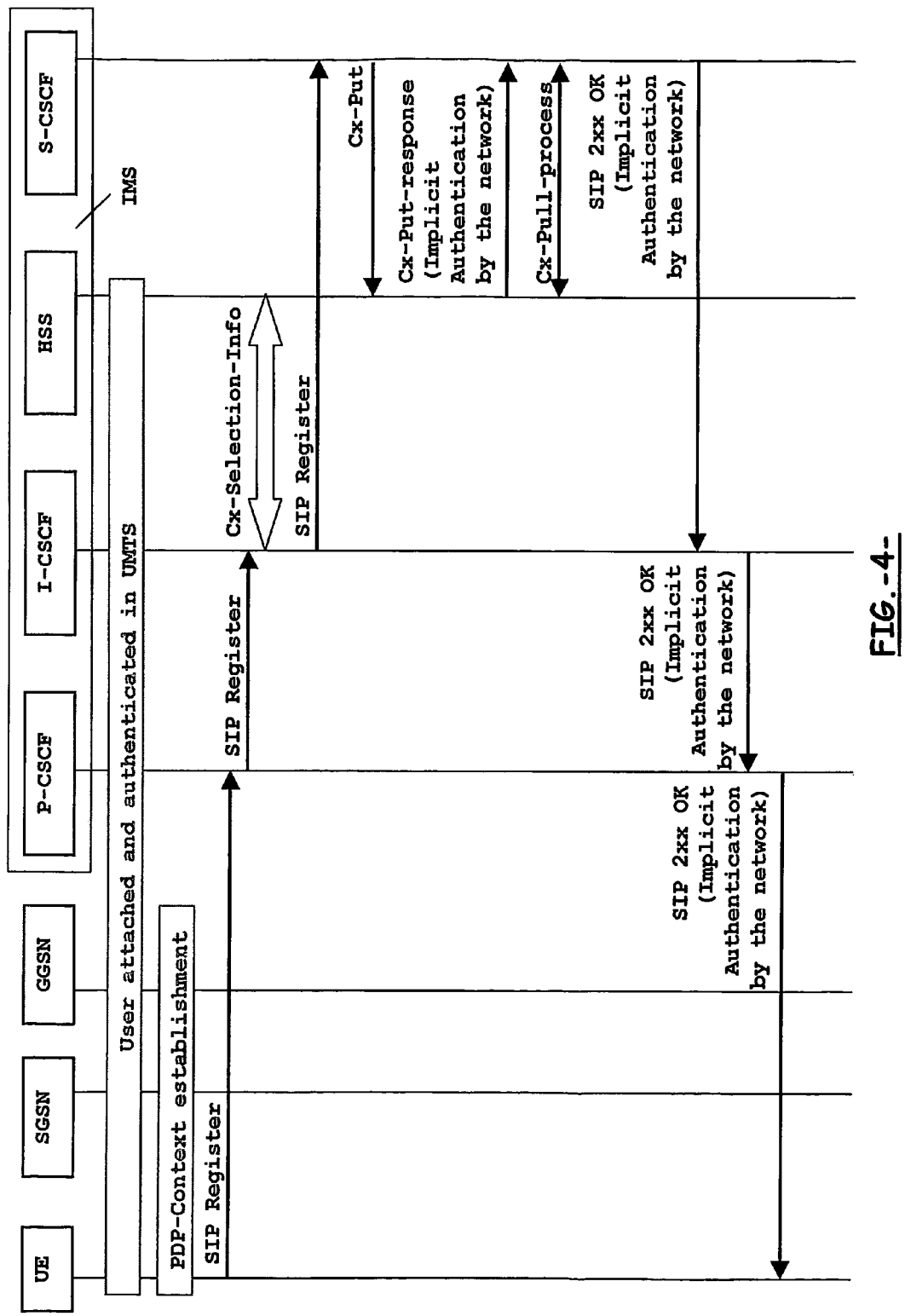
FIG. -4-

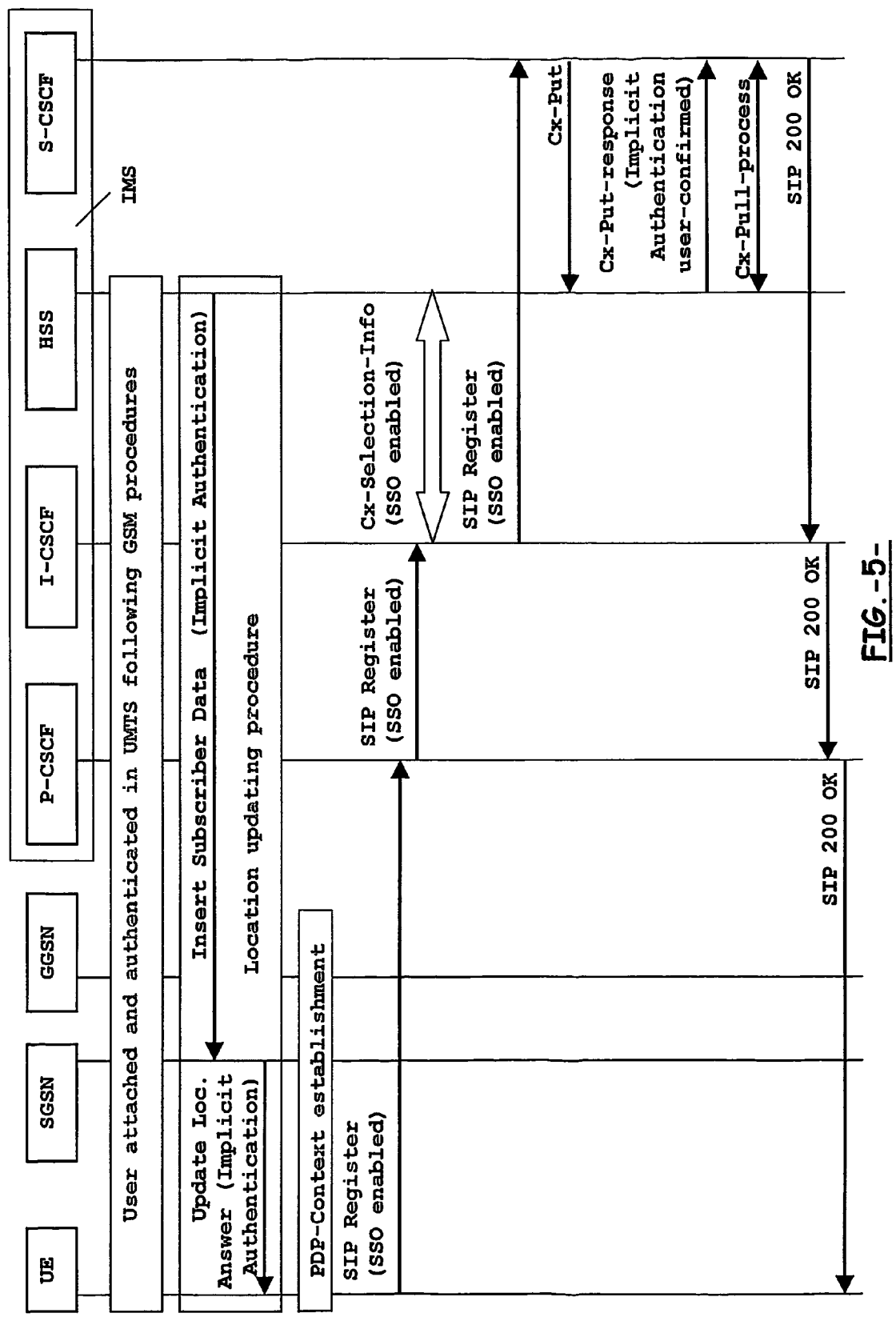
FIG. -5-

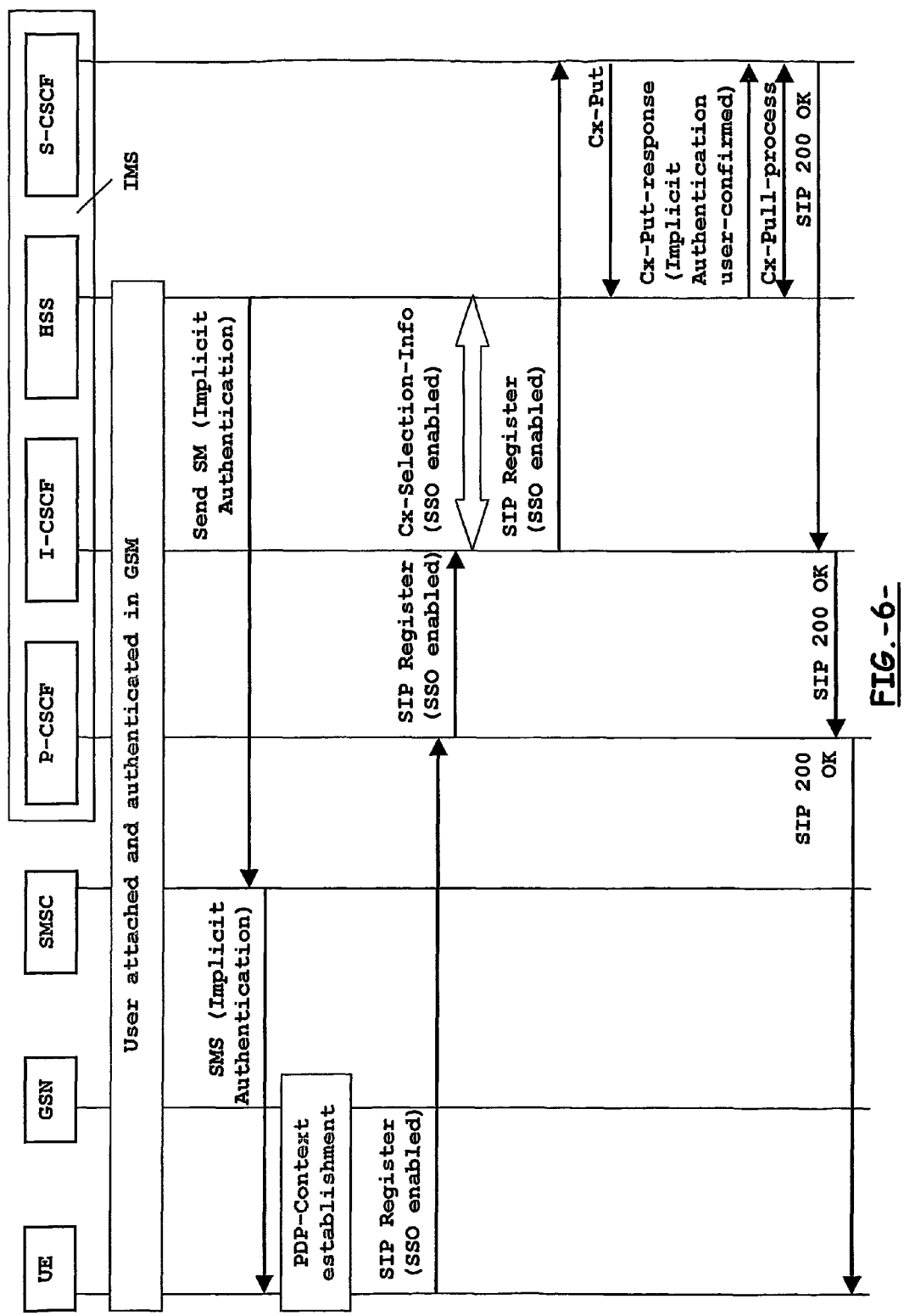
FIG. -6-

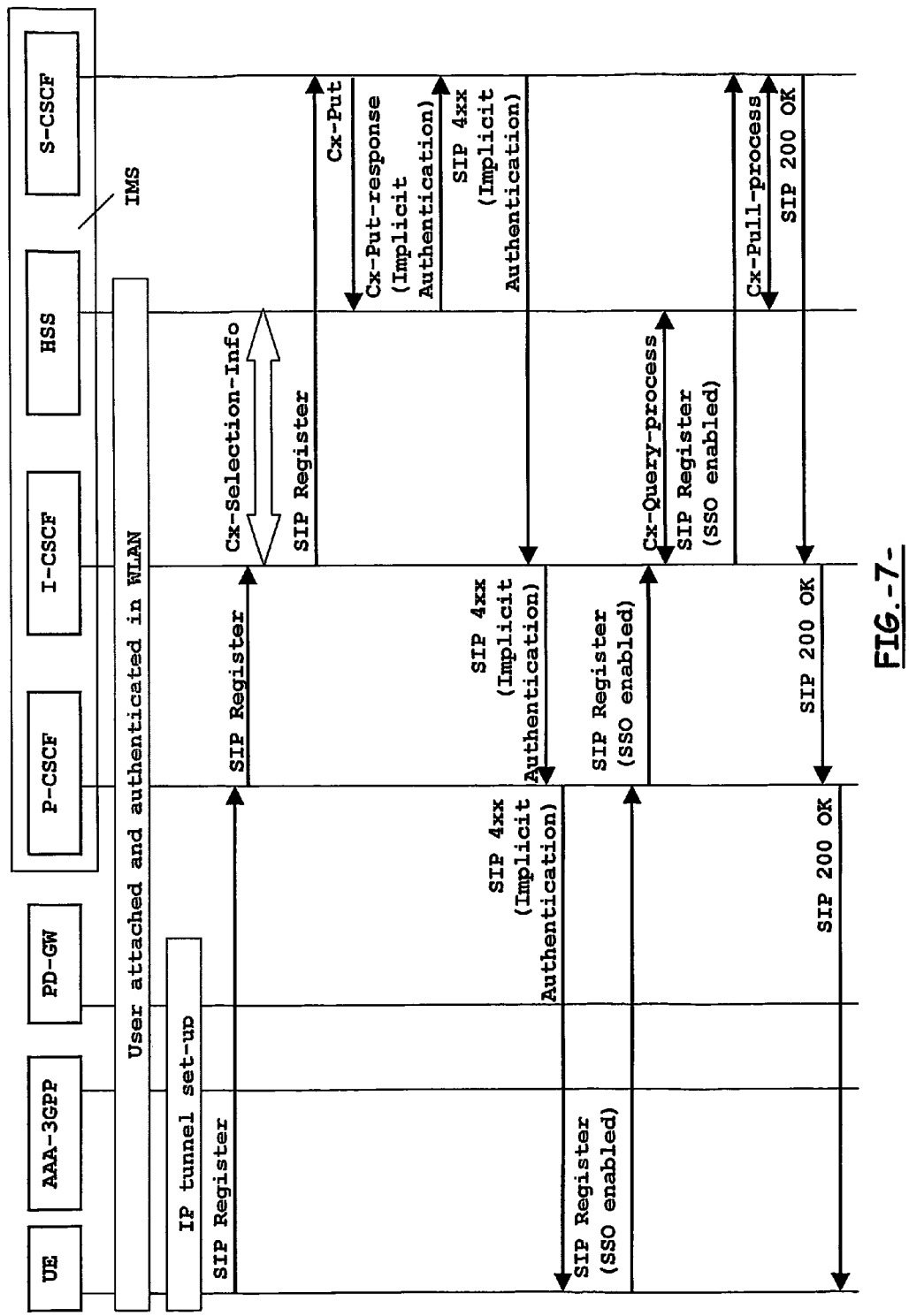
FIG. -7-

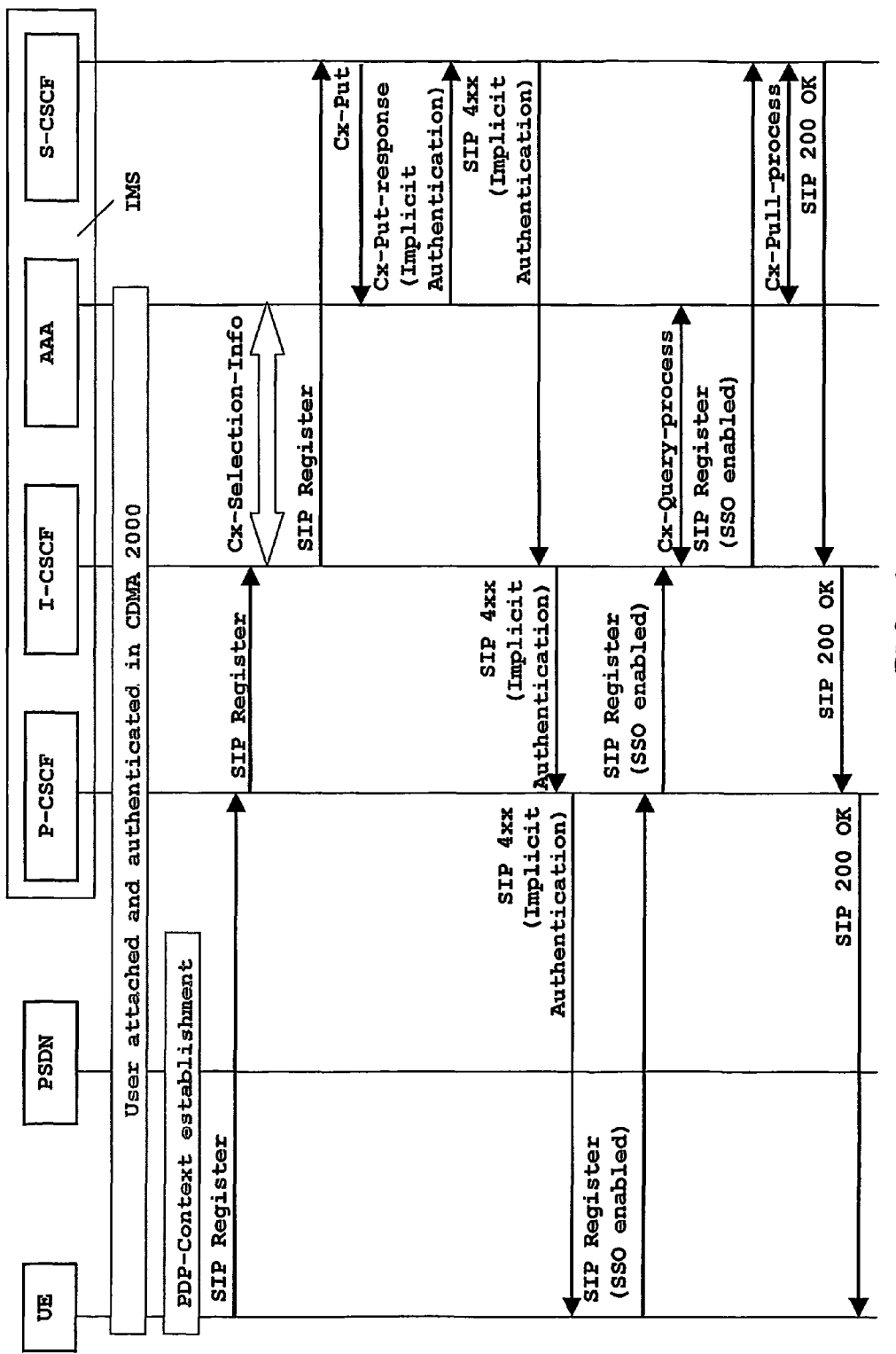
FIG.-8-

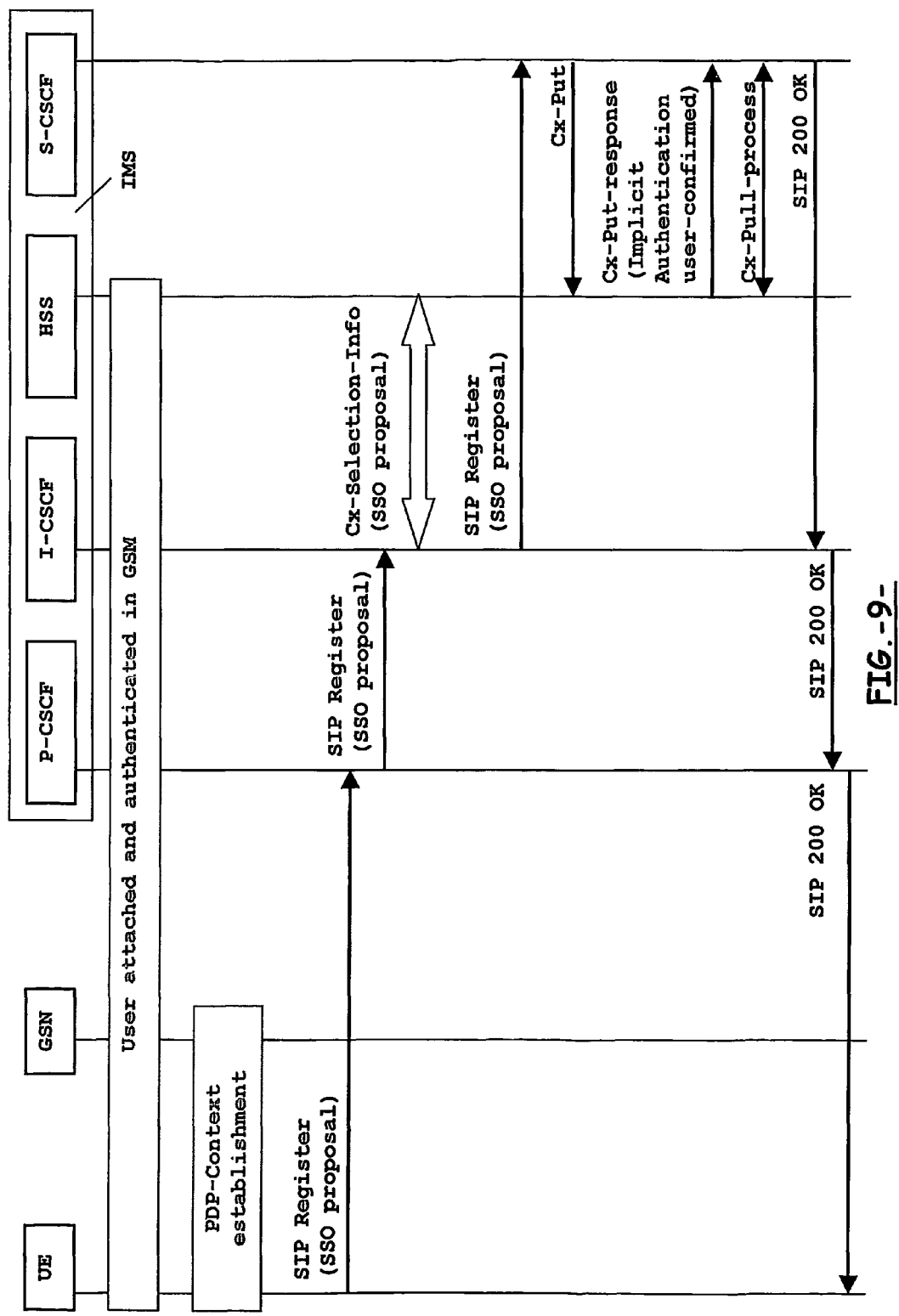
FIG. -9-

APPARATUS AND METHOD FOR AUTHENTICATING A USER WHEN ACCESSING TO MULTIMEDIA SERVICES

FIELD OF THE INVENTION

The present invention relates to a simplified procedure for authenticating a user accessing to a Multimedia network through an Access network where the user had been already authenticated.

BACKGROUND

Many of presently existing mobile networks, as well as possible future networks being defined by standardization bodies, require end-users and user-agents to authenticate themselves when accessing a network and, rather, when accessing services associated to the network. In this respect, GSM, GPRS, Wireless Local Area Network (WLAN) and Multimedia (IMS) domains, as defined by 3GPP and 3GPP2 standards, they all require user's equipment or terminals arranged to run an authentication procedure specific for each particular technological domain before granting users or user-agents the access to said domains. In particular, the technological domains cited above, as well as other emerging technological domains, require different security levels that complicate more the access throughout different technological domains. This access throughout implies extra security that is not always needed and, as a consequence, extra processing and signalling capabilities as well as extra complexity in the user's equipment or terminals.

Currently, the authentication procedure in a 3GPP Multimedia domain is carried out as described in 3G TS 33.203 standard and depicted in FIG. 1 in terms of a Session Initiation Protocol (SIP) based signalling flow. As FIG. 1 illustrates and the referred technical specifications describe, Multimedia authentication shall be carried out always when a user is registering in the Multimedia domain, what is typically started by sending a SIP Register message for a given private and public identity.

An initial condition assumed before starting the flow cited above is that an end-user must have a data connection open before accessing the Multimedia domain. This connection may be either a GPRS connection in terms of having a PDP context activated, or a WLAN connection in terms of having established a data connection as specified by the IEEE 802.11 standards, or another Access network providing the user side with a data connection. In this scenario, an end-user or a user-agent have been already authenticated by the access network, whether GPRS or WLAN or another, in order to establish such data connection and before sending a SIP Register to the Multimedia domain.

In particular, both currently used access networks, namely GPRS and WLAN, are offering respective authentication mechanism, SIM/USIM-AKA for GPRS and EAP-SIM/AKA for WLAN, whereas the Multimedia domain currently makes use of an authentication mechanism offering a similar level of security as the above access networks, the so-called USIM-AKA, which is carried out when the SIP Register message reaches a Serving Call Status Control Function (S-CSCF) entity as shown in FIG. 1. In this respect, FIG. 2 illustrates the sequence of actions followed to carry out an EAP AKA authentication for a user having accessed a WLAN network wherein RADIUS and MAP seems to be the most probable protocol alternatives though DIAMETER could also be used instead of RADIUS or MAP.

At present, a user wanting to get access to the Multimedia domain requires a previous establishment of a data connection, what is frequently carried out through an access network such as GPRS or WLAN and, consequently, the user has been authenticated firstly with an EAP-SIM/AKA for a WLAN access network, and further the user should be authenticated secondly with a USIM-AKA when registering into the Multimedia domain.

One may conclude that at present there is no authentication mechanism carrying out a cross-domain authentication for a given user between an access network such as GPRS or WLAN and a SIP-based Multimedia domain. In other words, there is no existing service or device that is able to administer authentication data on behalf of a user or a SIP user-agent and relieve said user or SIP user-agent from having to perform authentication operations in the Multimedia domain once an authentication has already taken place in the access network where the user is accessing through, said access network being likely GPRS or WLAN.

In this situation, the authentication for Multimedia domain as described in 3G TS 33.203 and illustrated in FIG. 1 adds extra signalling in the radio path that, under some scenarios, might be unnecessary. Firstly, after a SIP Register is received by the S-SCSF, the S-SCSF typically sends an Authentication Challenge message to the SIP user-agent. If this operation is successful, then the S-CSCF will periodically send an Authentication-Vector-request to the SIP user-agent that in turn must respond with an Authentication-Vector-response. Both of these messages add extra load on the multimedia domain as well as longer registration times. That is, SIP user-agents should process and respond to both the Authentication-Challenge and Authentication-Vector-request. These messages require extra processing by the SIP user-agent which means that the SIP user-agent has to make use of power for this process rather than using as much power as possible for Multimedia services that are likely of a high-power consumption nature, and bearing in mind the limited power of batteries.

Thereby, the present invention is aimed to provide an inter-domain authentication mechanism carrying out a cross-domain authentication for a given user between an access network domain and a Multimedia domain, this inter-domain authentication mechanism being simpler than the currently existing one, and applicable where a user authentication has been carried out by the access network.

SUMMARY OF THE INVENTION

The above aim is accomplished in accordance with the present invention by the provision of the device of claim 1, the user's equipment of claim 10, and the method of claim 15, all arranged for re-using authentication data between different networks or between different technological domains, and with help from the serving entity of claim 23 in charge of authenticating the user in the Multimedia domain and from the Proxy entity of claim 29 and the interrogating entity of claim 32, both being entities of a Multimedia domain according to 3GPP and 3GPP2 standards. Therefore, there is a new feature provided in accordance with the invention, and referred to hereinafter as "Implicit Authentication for Multimedia domain", which may be implemented as a dedicated Multimedia Authentication device in close co-operation with a subscriber server, or be fully integrated in said subscriber server. Said subscriber server being a subscriber database involved during the subscriber authentication, for example a Home Subscriber Server (HSS) or an Authentication-Authorization-Accounting (AAA) server, and the Multimedia Authentication device holding the necessary logic and components to enable the re-use of authentication data between an access network such as a Wireless Local Area Network (WLAN), a General Packet Radio System (GPRS) network, a Universal Mobile Telecommunication System (UMTS), or a Code Division Multiple Access (CDMA 2000) network, and said Multimedia domain.

The device, which in accordance with the invention is useful for Multimedia authentication of a user accessing a Multimedia domain through an access network, is arranged for use in, or in co-operation with, a subscriber server of the access network holding authentication data for the user and accessible to the Multimedia domain. Said device comprises means for deciding that an implicit authentication between the user or, rather, between the user's equipment and the Multimedia domain can take place, and means for instructing a serving entity in charge of authenticating the user in the Multimedia domain that an implicit authentication can take place. The use of this device thus skipping the need for an explicit authentication.

In this device, the means for deciding that an implicit authentication can take place preferably includes means for determining the potential security of the signalling path to access the Multimedia domain through said access network. For this purpose, the device may comprise as well provisioning and configuration data means arranged to assess the security of different signaling paths. Moreover, the means for deciding that an implicit authentication can take place may include means for processing a proposal of implicit authentication originated from the user's equipment.

The device is advantageously arranged to determine whether an implicit authentication is just a proposal to the user's equipment, which may force an explicit authentication, or it is a final decision taken by the network, so that no explicit authentication can be carried out. Therefore, the means for instructing the serving entity that an implicit authentication can take place include means for indicating that the final decision is on the user's equipment and means for indicating that this is a final decision taken by the network.

In this respect, the device further comprises means for notifying the user that an implicit authentication of the user for accessing the Multimedia domain can by carried out by the network. Nevertheless, this notification means might as well reside in other entities of the Multimedia domain.

Moreover, given that the final decision on whether or not to perform an implicit authentication may be on the user's equipment side in accordance with the invention, the device further comprises means for receiving an indication originated from the user's equipment side to confirm the acceptance of the implicit authentication proposed by the network. In case of receiving such acceptance confirmation, the device also comprises means for indicating to the serving entity in charge of authenticating the user in the Multimedia domain that the user's equipment has confirmed the implicit authentication. Still further, the device may have the means for providing additional authentication data to said serving entity, said additional authentication data including at least one element selected from a group of elements comprising: authentication type; access information; and authentication timestamp.

Conventionally, a user's equipment is enabled to get access to a Multimedia domain through an access network, and is thus arranged to carry out a first explicit Authentication procedure with the access network, and a second explicit authentication procedure with a Multimedia domain. The access network comprises a subscriber server to hold authentication data for the user and, for the purpose of the present invention, said subscriber server is accessible to the Multimedia domain. The user's equipment, in accordance with the invention, comprises means for processing at least one notification selected from a group of notifications including: a notification from the Multimedia domain indicating that an implicit authentication for the user can be carried out; and a notification towards the Multimedia domain indicating that the user's equipment proposes an implicit authentication to the network.

This means may advantageously include means for receiving an indication from the Multimedia domain that the final decision is on the user's equipment side, which might force an explicit authentication, or that it is a final decision taken by the network, so that no explicit authentication can be carried out. Especially arranged for the case where the final decision is on the user's side, the user's equipment further comprises means for sending towards the Multimedia domain an indication to confirm the acceptance of an implicit authentication proposed by the network. Moreover, the user's equipment may have the means for providing additional authentication data towards the Multimedia domain, said additional authentication data including at least one element selected from a group of elements comprising: authentication type; access information; and authentication timestamp.

There is also provided a method for authenticating a user in a Multimedia domain when the user accesses thereto through an access network, the method conventionally comprising a step of authenticating the user in the access network, said access network having a subscriber server with authentication data for the user and accessible to the Multimedia domain; and a step of registering the user into the Multimedia domain.

This method, in accordance with the invention, also comprises:

a step of deciding that an implicit authentication between the user and the Multimedia domain can take place, thus skipping the needs for an explicit authentication; and a step of instructing a serving entity in charge of authenticating the user in the Multimedia domain that implicit authentication can take place.

This method may further comprise a step of notifying from the Multimedia domain to the user's equipment that an implicit authentication of the user for accessing the Multimedia domain can by carried out.

In this method, the step of deciding that an implicit authentication can take place preferably includes a step of determining the potential security of the signalling path to access the Multimedia domain through said access network. Moreover, the above step of deciding that an implicit authentication can take place may include as well a step of proposing from the user's equipment towards the Multimedia domain an implicit authentication to be carried out between said user's equipment and Multimedia domain.

Also in this method, the step of instructing the serving entity that an implicit authentication can take place preferably includes a step of indicating whether the final decision is on the user's equipment, which might force an explicit authentication, or the final decision is taken by the network, so that no explicit authentication can be carried out. In addition, and specifically for the case where the final decision is on the user's side, the method may further comprise a step of confirming from the user's equipment the acceptance of the implicit authentication proposed by the network. Moreover, and aligned with the above step, the method may further comprise a step of indicating to the serving entity in charge of authenticating the user in the Multimedia domain that the user has confirmed the implicit authentication.

The invention further provides for a serving entity in charge of authenticating a user's equipment in the Multimedia domain when the user accesses thereto through an access network where said user had been previously authenticated. This serving entity comprises, in accordance with the invention, means for receiving instructions from the above device indicating that an implicit authentication can take place; and means for notifying the user's equipment that an implicit authentication of the user for accessing the Multimedia domain can by carried out by the network.

This serving entity is advantageously arranged in such manner that the means for notifying the user that an implicit authentication can by carried out by the network includes means for indicating to the user whether the implicit authentication is a final decision taken by the network and no explicit authentication can be carried out, or the implicit authentication is a proposal from the network that the user may accept or refuse by forcing an explicit authentication.

In the case that the implicit authentication is a proposal by the network, the serving entity advantageously comprises means for receiving an indication originated from the user's equipment to confirm the acceptance of such implicit authentication proposed by the network. Moreover, this serving entity preferably comprises means for receiving such indication that the user has confirmed the implicit authentication from the above device.

This serving entity may advantageously comprise further means for checking the matching of additional authentication data respectively received from the above device and user's equipment in order to provide an extra security support. These additional authentication data include at least one element of a group of elements comprising: authentication type, access information and authentication timestamp.

The invention is further complemented with the provision of some other entities, such as a Proxy and an interrogating entity, in order to address a typical topology following a 3GPP or a 3GPP2 standard.

The Proxy entity, in accordance with 3GPP and 3GPP2 standards, is intended to act as an entry point into the Multimedia domain for users accessing thereto through an access network where the user had been already authenticated. This Proxy entity, in accordance with the invention, comprises means for processing at least one notification selected from a group of notifications including:

a notification sent towards the user's equipment to indicate that an implicit authentication of the user for accessing the Multimedia domain can by carried out by the network; and a notification received from the user's equipment to propose an implicit authentication towards the Multimedia domain between said user's equipment and Multimedia domain.

This Proxy entity is also advantageously arranged so that the means for notifying the user that an implicit authentication can by carried out by the network includes means for indicating to the user whether the implicit authentication is a final decision taken by the network and no explicit authentication can be carried out, or the implicit authentication is a proposal from the network that the user may accept or refuse by forcing an explicit authentication.

In the case that the implicit authentication is a proposal by the network, the Proxy entity advantageously comprises means for receiving an indication from the user's equipment accepting such implicit authentication proposed by the network.

The interrogating entity, in accordance with 3GPP and 3GPP2 standards, is intended to query a subscriber server in the Multimedia domain about a user having accessed said Multimedia domain through another access network. This interrogating entity has means for receiving a registration request from the user, and means for acknowledging such registration towards the user and, in accordance with the invention, the interrogating entity also comprises means for transmitting an indication towards the user's equipment that an implicit authentication of the user for accessing the Multimedia domain can by carried out.

The interrogating entity, in order to accomplish with other advantageous features provided by the invention, preferably comprises means for receiving an indication originated from the user's equipment to confirm acceptance of an implicit authentication proposed by the network, or to propose such implicit authentication by itself; and means for transmitting such confirmation of user's acceptance towards at least one entity selected from a group of entities comprising the above device and serving entity.

Moreover, and also for accomplishing with other advantageous features provided by the invention, the interrogating entity further comprises means for transmitting towards the user's equipment an indication that the implicit authentication is a final decision taken by the network and no explicit authentication can be carried out.

BRIEF DESCRIPTION OF DRAWINGS

The features, objects and advantages of the invention will become apparent by reading this description in conjunction with the accompanying drawings, in which:

FIG. 1 shows a basic diagram of the authentication flow in a Multimedia domain in accordance with the 3GPP TS 33.203.

FIG. 2 illustrates an overview of architectural components and signalling flow during authentication of a user following an EAP-AKA mechanism through a WLAN access network.

FIG. 3 shows a flow sequence describing a currently preferred embodiment for re-using previous authentication of a user having access through a GPRS or UMTS network to the Multimedia domain where the user's equipment receives a notification in this respect and is given the possibility to accept or not an Implicit Authentication.

FIG. 4 shows a flow sequence describing an alternative embodiment to the one shown in FIG. 3, where the user's equipment receives a notification in this respect and without being given the possibility to accept or not an Implicit Authentication, but rather being informed that such Implicit Authentication has taken place.

FIG. 5 shows an alternative flow sequence describing an alternative embodiment to the ones shown in FIG. 3 and FIG. 4, where the user's equipment receives an invitation during the location procedure to further carry out an Implicit Authentication towards the Multimedia domain, the user thus being given the possibility to accept or not an Implicit Authentication.

FIG. 6 shows an alternative flow sequence to the one shown in FIG. 5, where the user's equipment receives an invitation with a Short Message Service (SMS) to further carry out an Implicit Authentication towards the Multimedia domain, the user thus being given the possibility to accept or not an Implicit Authentication.

FIG. 7 shows a flow sequence describing a currently preferred embodiment for re-using previous authentication of a user having access through a WLAN network to the Multimedia domain where the user's equipment receives a notification in this respect and is given the possibility to accept or not an Implicit Authentication.

FIG. 8 shows a flow sequence describing another preferred embodiment for re-using previous authentication of a user by a CDMA 2000 network, the user accessing through a Packet Data Service network to the Multimedia domain where the user's equipment receives a notification in this respect and is given the possibility to accept or not an Implicit Authentication.

FIG. 9 shows an alternative flow sequence to those presented in FIGS. 5 and 6, where the user's equipment does not receive an invitation, with an Update Location Answer message or with a Short Message Service (SMS) respectively, to further carry out an Implicit Authentication but rather the user's equipment generates a proposal for an implicit authentication to the network.

DETAILED DESCRIPTION OF PREFERRED EMBODIMENTS

The following describes currently preferred embodiments of an apparatus, a user's equipment and method for offering a user the possibility to be implicitly authenticated by a Multimedia domain when accessing through an access network where the user has been already authenticated. The access network being preferably a Wireless Local Area Network (WLAN), a General Packet Radio System (GPRS) network, a Global System for Mobile communications (GSM) network, a Universal Mobile Telecommunication System (UMTS) network, or a Code Division Multiple Access network (CDMA 2000).

The present invention presents several aspects in connection with the place wherein the feature "Implicit Authentication for Multimedia domain" resides, which in particular may be carried out by an isolated device in close co-operation with a subscriber server or be carried by the subscriber server itself.

Moreover, the present invention also presents several aspects in connection with the user's equipment, namely the user's terminal, or SIM, or USIM, or combinations thereof, depending on the decision degree is left on the user's side or on the network side.

In accordance with a first aspect of the present invention, the subscriber server itself, which in particular may be a HSS in 3GPP or an AAA-server in 3GPP2 standards and CDMA 2000 networks, or a Multimedia Authentication device supporting the access to the Multimedia domain for a specific user determines that an explicit authentication for the Multimedia domain might be unnecessary based on a previous subscriber authentication carried out by the access network where the user is accessing through, and based on an assumption that a secure bearer for Multimedia signalling is carried out through the access network. Such secure bearer may be for instance a PDP context in case of GPRS being the access network, or a secure tunnel in case of WLAN being the access network towards the home network while carrying out the subscriber authentication.

In accordance with the invention, the subscriber server, or the dedicated Multimedia Authentication device, provides to a serving entity in charge of authenticating the user, namely a Serving Call Status Control Function (S-CSCF), an authentication policy indicating that an Implicit Authentication procedure can be performed for said user accessing the Multimedia domain, based on a previous bearer authentication through the access network.

Apart from authenticating a user by the network where the user is accessing, the 3GPP authentication procedures support the authentication of the network by the user. Therefore, and in accordance with another aspect of the invention, the subscriber server or the dedicated Multimedia Authentication device can optionally indicate to the user's equipment another authentication policy to suggest a possible mutual Implicit Authentication that the user may or may not accept.

Thanks to the feature "Implicit Authentication for Multimedia domain", the amount of authentication operations performed either by the user or by the user's equipment, and by the network is reduced and, thus, a reduction of avoidable signalling messages in the Multimedia domain is achieved while maintaining the required security level, accomplishing one object of the present invention.

The invention is applicable to different scenarios where a user makes use of a particular access network for accessing the Multimedia domain, thus resulting in different embodiments of the invention. In addition, several variations may be introduced from one embodiment to one another without substantially departing from the scope of the present invention.

A first scenario turns up where a user has been authenticated by a UMTS network and is further accessing the Multimedia domain through a GPRS network.

Under this scenario and in accordance with a first embodiment of the present invention illustrated in FIG. 3, there is provided a simplified mechanism for authenticating the user in the Multimedia domain wherein the user is notified of a possible implicit authentication. The user, or rather the user's equipment side (UE), upon receiving this notification, may accept the implicit authentication or force an explicit authentication in accordance with the applicable standard for the Multimedia domain as FIG. 1 illustrates. Moreover, this implicit authentication may apply to both authentication of the user by the network as well as authentication of the network by the user. Furthermore, said implicit authentication might be triggered by a subscriber server such as the Home Subscriber Server (HSS) responsible for the previous authentication of the user in the UMTS network, as illustrated in FIG. 3, or by a dedicated Multimedia Authentication device in co-operation with said subscriber server.

Therefore, in accordance with this first embodiment shown in FIG. 3, an end-user or user's equipment is attached and authenticated in UMTS and has a GPRS PDP context open. At this stage, the end-user and user-agent gain access to the Multimedia domain by initiating a SIP Registration procedure.

This SIP Registration procedure comprises the sending of a SIP Register message from the user side (UE) towards a Proxy Call Status Control Function (P-CSCF), and from this entity towards an Interrogating Call Status Control Function (I-CSCF). The I-CSCF initiates a conventionally called Cx-Selection-Info procedure towards the Home Subscriber Server (HSS) in order to identify the Serving Call Status Control Function (S-CSCF) currently in charge of the user. Once such S-CSCF is identified, the I-CSCF sends a corresponding SIP Register message to the S-CSCF. The S-CSCF receiving such registration message initiates a conventionally called Cx-Put procedure towards the Home Subscriber Server (HSS).

Given that the HSS had previously participated in the GPRS access authentication of the user by exchanging a user profile and authentication vectors with a Serving GPRS Support Node (SGSN), the HSS uses its information about the SGSN where the subscriber is located, in addition to other network topology information, to determine the potential security of the signalling path for accessing the Multimedia domain through said access network. Thereby, in accordance with the invention, the HSS itself, or a dedicated Multimedia Authentication device, can decide an Implicit Authentication for the user. To this end, the HSS includes an indication of "Implicit Authentication" in the Cx-Put-response towards the S-CSCF.

The decision to send this message towards the S-CSCF is advantageously made when the Gateway GPRS Support Node (GGSN) belongs to the same home domain as the HSS and the GGSN is thus considered secure and trusted. A particular suitable scenario is when the HSS also trusts on the SGSN where the subscriber is located as they both belong to a same network operator, for instance, and irrespective of whether the user is given or not the possibility to further refuse the proposed implicit authentication.

In addition, the feature "Implicit Authentication for Multimedia domain" may include data provisioning and data configuration on subscriber basis so that when a user has this service provisioned and the user is trusted, the HSS itself, or a dedicated Multimedia Authentication device, can determine an Implicit Authentication for that user. In this respect and taking into account that a particular user may be given a plurality of user's identifiers in the Multimedia domain, the implicit authentication hereinafter referred to, and described under different embodiments, can apply to all or to specific user's identifiers in the Multimedia domain.

Additionally, other relevant information may also be sent towards the S-CSCF in the Cx-Put-response message, such as authentication type, access information like for example IP address and contact information, authentication timestamp, and other significant data in order to provide an extra security support.

Accordingly with an aspect of the invention commented above, the user may be notified of an Implicit Authentication proposed by the network and intended for the user to accept it or not. Therefore, the S-CSCF sends to the SIP user-agent a new SIP message called "SIP 4xx Implicit Authentication" in the instant specification so that the SIP user-agent, if found acceptable, disables internally the explicit Multimedia Authentication procedure conventionally carried out. That is, the SIP user-agent shall not wait, or expect to receive, either an Authentication-Challenge message or authentication vectors as described in 3G TS 33.203. Moreover, the SIP user-agent or, more generally, the user's equipment shall consider the network supporting the Multimedia domain as implicitly authenticated. On the other hand, the SIP user-agent might consider the Implicit Authentication being not acceptable, in which case an appropriate negative acknowledge not shown in any drawing is sent towards the network in order to force a conventional explicit authentication mechanism according to the above applicable standard.

Still with reference to FIG. 3, once the SIP user-agent has accepted the Implicit Authentication, it responds to this message with a new SIP Register message.

At this stage, one may be aware that thanks to the Implicit Authentication carried out in accordance with the invention by re-using at the Multimedia domain authentication data from a trusted access network, the present invention also provides an advantageous solution to support Single Sign-On (SSO) at the Multimedia domain for users who had been already authenticated by an access network before accessing to said Multimedia domain.

Aligned with this advantageous solution, FIG. 3 shows that the SIP Register ultimately sent from the SIP user-agent of the user's equipment to the S-CSCF includes an indication of "SSO enabled" intended to indicate to the network that the Implicit Authentication is accepted. The network submits such SIP Register message towards the S-CSCF that in turn sends back a successful result "SIP 200 OK" towards the user's equipment. The end-user is now registered in the Multimedia domain without those extra periodic authentication processes conventionally occurring throughout the end-user's Multimedia registration.

Generally speaking for this and also applicable for other embodiments further described, and provided that there is a notification from the user's equipment about an implicit authentication, the serving entity (S-CSCF) might check as well whether other relevant data, respectively included in the SIP Register and in the Cx-Put-response, are coincident with regard to the implicit authentication and single sign-on access. Said relevant data may be, for example, an authentication type, access information like for example IP address and contact information, an authentication timestamp, or combinations thereof, and other significant data to provide an extra security support.

Still under the above scenario where a user has been authenticated by a UMTS network and is further accessing the Multimedia domain through a GPRS network, and in accordance with a second embodiment illustrated in FIG. 4, there is provided a still more simplified mechanism for authenticating a user in the Multimedia domain wherein the user is just notified of a decision taken by the network to carry out an implicit authentication. Under this second embodiment, the user attaches the UMTS network and is authenticated therein with participation of the home subscriber server (HSS), a PDP context is activated with GPRS entities (SGSN, GGSN), and a SIP Register message is sent towards the Call Status Control Function (P-CSCF, I-CSCF, S-CSCF) entities in order to register into the Multimedia domain in a similar manner as done in the first embodiment. The difference between these first and second embodiments is that the HSS itself, or a dedicated Multimedia Authentication device, makes a final decision to carry out an Implicit Authentication for the user. To this end, the HSS includes an indication "Implicit Authentication by the network" in the Cx-Put-response towards the S-CSCF.

Then, after having completed a "Cx-Pull-process" between the S-CSCF and the HSS, and without having requested the user's acceptance, the S-CSCF notifies to the user that the network has performed an Implicit Authentication on its own by including an indication "Implicit Authentication by the network" in an specific "SIP 2xx OK" response, instead of using the above new "SIP 4xx" message.

Upon reception of said "SIP 2xx OK" response with an indication "Implicit Authentication by the network", the SIP user-agent shall not wait, or expect to receive, either an Authentication-Challenge message or authentication vectors as described in 3G TS 33.203. Moreover, the SIP user-agent or, more generally, the user's equipment may consider the network supporting the Multimedia domain as implicitly authenticated, provided that the user's equipment is configured to carry out such authentication of the network.

The end-user is now registered in the Multimedia domain without those extra periodic authentication processes conventionally occurring throughout the end-user's Multimedia registration, and still with a simpler mechanism than the one described in the first embodiment.

A second scenario turns up where a user has been authenticated by a UMTS network following a GSM attach and location updating procedure, and is further accessing a Multimedia domain through a GPRS network. In this respect and for the sake of clarity, the Home Subscriber Server (HSS) of a UMTS network comprises all the basic functionality and behaves as a traditional Home Location Register (HLR) of a GSM network, plus all the functionality required for acting as a subscriber server in a Multimedia domain. Nevertheless, provided that the traditional HLR functionality resides in a different entity than the subscriber server for the Multimedia domain, an additional interface between both entities, namely the GSM HLR and the subscriber server for the Multimedia domain, is used to share user authentication data.

A still third embodiment under the above second scenario is illustrated in FIG. 5 wherein a new field is returned to the SIP user-agent of the user's equipment during GSM attach and location updating procedures. Therefore, the subscriber server (HSS) of the Multimedia domain includes an indication of "Implicit Authentication" in the GSM operation "Insert Subscriber Data" towards the Serving GPRS Support Node (SGSN) in the access network. Then, the SGSN also includes this indication of "Implicit Authentication" in the GSM operation "Update Location Answer" towards the SIP user-agent.

This indication can apply to all or specific user's identifiers in the Multimedia domain, and is understood by the user's equipment (UE) as an implicit invitation to enable a Single Sign-On (SSO) access to the Multimedia domain that the user's equipment may or may not accept. Provided that the implicit authentication is acceptable for the end-user (UE) since no extra security is required, a SIP Register message is sent to the Multimedia domain (P-CSCF, I-CSCF), the SIP Register message including an indication of "SSO enabled" intended to indicate to the network that the Implicit Authentication is accepted.

Upon reception of such SIP Register message in an Interrogating Call Status Control Function (I-CSCF) entity, the indication of "SSO enabled" is incorporated in a new field of a "Cx-Query" message included in a so-called "Cx-Selection-Info" procedure held with the Multimedia domain subscriber server (HSS). At this stage, the feature "Implicit Authentication for Multimedia domain" in the HSS itself, or in a dedicated Multimedia Authentication device, processes the indication of "SSO enabled" in order to further provide authentication data for the user upon request.

The indication of "SSO enabled" is also incorporated in the SIP Register sent from the I-CSCF towards the Serving Call Status Control Function (S-CSCF) entity presently selected for serving the user. As in previous embodiments, the present embodiment illustrated in FIG. 5 also shows a "Cx-Put" operation carried out from the S-CSCF to the HSS. The HSS thus instructs the S-CSCF with a "Cx-Put-response" operation that includes an indication of "Implicit Authentication confirmed by user" in order to preclude a further authentication of the end-user and to avoid sending authentication vectors for said end-user. In turn, the S-CSCF might check as well whether other relevant data respectively included in the SIP Register and in the Cx-Put-response, are coincident with regard to the implicit authentication and single sign-on access, relevant data such as authentication type, access information like for example IP address and contact information, authentication timestamp, or combinations thereof, and other significant data to provide an extra security support.

Eventually, after having concluded a "Cx-Pull-process" between the S-CSCF and the subscriber server (HSS), the S-CSCF returns back to the user a conventional successful result "SIP 200 OK" towards the SIP user-agent at the user's equipment.

A further fourth embodiment under the above second scenario is illustrated in FIG. 6 wherein the only difference with the previous third embodiment shown in FIG. 5 is that the indication of "Implicit Authentication" is returned to the SIP user-agent of the user's equipment in a Short Message sent from a Short Message Service Centre (SMSC) as previously instructed by the subscriber server (HSS) itself, or by a dedicated Multimedia Authentication device, and once the GSM attach and authentication procedures are over, instead of being done during the location updating procedure. For the sake of clarity in drawings, the pair of GPRS entities SGSN and GGSN in FIG. 5 are replaced with a so-called "GSN" entity in FIG. 6. This indication of "Implicit Authentication", as for an above embodiment, can also apply to all or specific user's identifiers in the Multimedia domain. Once the user's equipment is aware of having received this indication of "Implicit Authentication", and provided that such implicit authentication is found acceptable, the user's equipment processes the message, and includes an indication of "SSO enabled" in a SIP Register message being sent to access the Multimedia domain (P-CSCF, I-CSCF), the indication of "SSO enabled" intended to indicate to the network that the Implicit Authentication is accepted by the user's equipment. From this point on, the signalling flow may be the same as in the previous third embodiment.

Also in the embodiments under this second scenario the end-user is registered in the Multimedia domain without those extra periodic authentication processes conventionally occurring throughout the end-user's Multimedia registration, and with a simpler mechanism than the one conventionally carried out.

A third scenario turns up where a user, accessing through a Wireless Local Area Network, has been authenticated by a UMTS network and is further accessing the Multimedia domain through this Wireless Local Area Network (WLAN).

In accordance with a fifth embodiment illustrated in FIG. 7 under this third scenario, an end-user is attached and authenticated in WLAN by the UMTS network, the end-user, or rather the user's equipment (UE), has obtained an IP session open preferably by using a conventionally so-called secure tunnel to the home network. This secure tunnel is preferably established between the user's equipment and a Packet Data Gateway (PD-GW) by encapsulating data from the above IP session, generally an IP address, within the encrypted message payload, whilst an external IP address not related to the IP session is used between the user's equipment (UE) and the Packet Data Gateway (PD-GW).

At this stage and in like manner as for the first embodiment shown in FIG. 3, the signalling flow in FIG. 7 shows how the end-user and SIP user-agent, namely the user's equipment (UE), gain access to the Multimedia domain by sending a SIP Register message from the user side (UE) towards the Multimedia domain (P-CSCF, I-CSCF).

An Interrogating Call Status Control Function (I-CSCF) entity initiates a conventionally called "Cx-Selection-Info" procedure towards the Home Subscriber Server (HSS), namely the subscriber server in the Multimedia domain, in order to identify a Serving Call Status Control Function (S-CSCF) currently in charge of the user. Once such S-CSCF is identified, the I-CSCF sends a corresponding SIP Register message to the S-CSCF. The S-CSCF receiving such registration message initiates a conventionally called Cx-Put procedure towards the Home Subscriber Server (HSS).

Given that the HSS had previously participated in the authentication of the user for WLAN access by exchanging a user profile and user authentication vectors with a so-called "Authentication, Authorization and Accounting" server following the 3GPP standards (hereinafter referred to as AAA-3GPP), as illustrated in FIG. 2, the HSS can use its information about the secure tunnel in addition to other network topology information to determine the potential security of the signalling path for accessing the Multimedia domain through said access network. Thereby, in accordance with the invention, the HSS itself, or a dedicated Multimedia Authentication device, can decide an Implicit Authentication for said user. This decision is advantageously made when the Packet Data Gateway (PD-GW) belongs to the same home domain as the HSS, or in other situations where the PD-GW is considered secure and trusted. Moreover, the feature "Implicit Authentication for Multimedia domain" may include, as in previous embodiments, data provisioning and data configuration on subscriber basis so that when a user has this service provisioned and the user is trusted, the HSS itself, or a dedicated Multimedia Authentication device, can determine an Implicit Authentication for that user.

Therefore, the HSS incorporates an indication of "Implicit Authentication" in the "Cx-Put-response" towards the S-CSCF. Advantageously and for the sake of security, other relevant information may also be sent towards the S-CSCF in the "Cx-Put-response message", such as authentication type, access information like for example IP address and contact information, authentication timestamp, and other significant data to provide an extra security support.

This fifth embodiment in FIG. 7 is aligned with the first embodiment in FIG. 3 and both are in accordance with an aspect of the invention commented above, where the user may be notified of an Implicit Authentication proposed by the network and intended for the user to accept it or not.

Therefore, the S-CSCF sends to the SIP user-agent a new SIP message called "SIP 4xx Implicit Authentication" in the instant specification so that the SIP user-agent, if found acceptable, disables internally the explicit Multimedia Authentication procedure conventionally carried out. That is, the SIP user-agent shall not wait, or expect to receive, either an Authentication-Challenge message or authentication vectors as described in 3G TS 33.203.

Once the SIP user-agent has accepted the Implicit Authentication, it responds to this "SIP 4xx Implicit Authentication" message with a new SIP Register message that includes an indication of "SSO enabled" intended to indicate to the network that the Implicit Authentication is accepted. The network (P-CSCF, I-CSCF) submits such SIP Register message towards the S-CSCF that in turn sends back a successful result "SIP 200 OK" towards the user's equipment (UE). The end-user, having accessed through a WLAN network, is now registered in the Multimedia domain without those extra periodic authentication processes typically occurring throughout the end-user's Multimedia registration.

The description for the fifth embodiment illustrated in FIG. 7 has been matched as much as possible with the one for the first embodiment shown in FIG. 3. Similarly, the teaching from the second embodiment shown in FIG. 4, where GPRS is the access network, can be conveniently applicable to another embodiment where WLAN is the access network, the latter not requiring further explanation in view of the above embodiments.

On the other hand, the above third embodiment, where GPRS is the access network, is practically applicable as well to another embodiment where WLAN is the access network inasmuch as the relevant authentication indications sent to the user's equipment are included as specific Attribute Value Pair (AVP) in the corresponding messages of a RADIUS or Diameter protocol used by WLAN access.

Eventually, the above fourth embodiment where GPRS is the access network is also applicable to another embodiment where WLAN is the access network assuming a support for Short Message Services (SMS) in WLAN, or by using the Circuit Switching technology of a GRPS infrastructure for SMS in case of having dual terminals as user's equipment.

A fourth scenario turns up where a user has been authenticated by a CDMA 2000 network following a Packet Data Service attach procedure, and is further accessing a Multimedia domain through a Packet Data Service network. FIG. 8 illustrates a sixth embodiment aligned with the one in FIG. 4 under the first scenario, wherein an Authentication Authorization and Accounting server (AAA) acts as subscriber server of a CDMA 2000 network. In this respect and for the sake of clarity, the Authentication Authorization and Accounting server (AAA) of the CDMA 2000 network comprises all the basic functionality required to allow the access to Packet Data Services in a CDMA 2000 network, and all the functionality required for acting as a subscriber server in a Multimedia domain.

Nevertheless, provided that the traditionally known AAA functionality for access to CDMA 2000 Packet Data Services resides in a different entity than the subscriber server for the Multimedia domain, an additional interface between both entities, namely between a traditional CDMA 2000 AAA and the subscriber server for the Multimedia domain, is used to share user authentication data.

Apart for these considerations, the above embodiments are also applicable to this scenario involving a CDMA 2000 network assuming that the relevant information may be transported using extensions to the current RADIUS and Diameter interfaces.

A still further embodiment is presented under the exemplary first scenario above and illustrated in FIG. 9, wherein the proposal for an implicit authentication (SSO Proposal) is actually triggered from the user's equipment (UE) itself and without having received a previous invitation from the Multimedia domain (IMS). Thus, the flow sequence in FIG. 9 presents an alternative embodiment to those in FIG. 5 and 6 wherein the user's equipment (UE) directly submits to the Multimedia domain (IMS) its proposal for an implicit authentication (SSO Proposal), without having received the previous invitation with an Update Location Answer message or with a Short Message Service (SMS), and in order to carry out such implicit authentication between said user's equipment and Multimedia domain.

This new approach might as well be applied to modify other above embodiments and independently of the applying scenario.

The invention is described above in respect of several embodiments in an illustrative and non-restrictive manner. Obviously, modifications and variations of the present invention are possible in light of the above teachings, and any modification of the embodiments that fall within the scope of the claims is intended to be included therein.

The invention claimed is:

1. A system for Multimedia authentication of a user equipment accessing a Multimedia domain through an access network, comprising:

subscriber server for first authenticating said user equipment within said access network, said subscriber server authorizing said user equipment to gain access to said access network wherein said subscriber server storing authentication data associated with said user equipment;

means for selectively deciding whether an implicit authentication between the user equipment and a serving call session control function (S-CSCF) of the Multimedia domain can take place based on said first authentication of the user equipment by the access network; and in response to a decision that said implicit authentication can take place, further comprising means for instructing the S-CSCF in the Multimedia domain that implicit authentication of the user equipment can take place by re-using said authentication data stored in the subscriber server and to not perform any explicit authentication between said S-CSCF and said user equipment: otherwise in response to a decision that no implicit authentication can take place, further comprising means for explicitly authenticating the user equipment by issuing an authentication challenge message from the S-CSCF to the user equipment.

2. The device of claim 1, wherein the means for deciding that an implicit authentication can take place includes means for determining the potential security of the signalling path to access the Multimedia domain through said access network.

3. The device of claim 1, wherein the means for instructing the S-CSCF that the implicit authentication can take place includes means for indicating that the final decision is on the user equipment side which can force an explicit authentication.

4. The device of claim 1, wherein the means for instructing the S-CSCF that the implicit authentication can take place includes means for indicating that this is a final decision taken by the network and no explicit authentication can be carried out.

5. The device of claim 1, further including means for notifying the user equipment that the implicit authentication of the user equipment for accessing the Multimedia domain can be carried out by the network.

6. The device of claim 1, wherein the means for deciding that the implicit authentication between the user equipment and the Multimedia domain can take place includes means for receiving a proposal of implicit authentication originated from the user equipment.

7. The device of claim 3, further comprising means for receiving an indication originating from the user equipment to confirm the acceptance of the implicit authentication proposed by the network.

8. The device of claim 7, further comprising means for indicating to the S-CSCF in charge of authenticating the user in the Multimedia domain that the user has confirmed the implicit authentication.

9. The device of claim 8, further comprising means for providing additional authentication data to said S-CSCF, said additional authentication data including at least one of
authentication type;
access information; and
authentication timestamp.

10. A user equipment enabled to obtain access to a Multimedia domain through an access network, and arranged to carry out a first explicit authentication procedure with the access network and a second explicit authentication procedure with the Multimedia domain, the user equipment comprising means for first explicitly authenticating with a subscriber server within said access network, said subscriber server authorizing said user equipment to gain access to said access network wherein said subscriber server storing authentication data associated with said user equipment;

in response to a decision that an implicit authentication can take place between the user equipment and a S-CSCF of the Multimedia domain, means for receiving a notification from the Multimedia domain indicating that an implicit authentication for the user equipment can be carried out by the network based on the first explicit authentication procedure with the access network by re-using said authentication data stored in said subscriber server and notifying the user equipment not to perform the second explicit authentication procedure with the multimedia domain; or in response to a decision that an implicit authentication cannot take place between the user equipment and said S-CSCF, means for receiving an authentication challenge message from the Multimedia domain for performing an explicit authentication with the user equipment.

11. The user equipment of claim 10, wherein the means for processing the notification received from the Multimedia domain includes means for receiving and processing an Implicit Authentication indication that the final decision is on the user equipment which can force an explicit authentication.

12. The user equipment of claim 11, further comprising means for sending towards the Multimedia domain an Single Sign On (SSO) enabled indication to confirm the acceptance of the implicit authentication proposed by the network.

13. The user equipment of claim 12, further comprising means for providing additional authentication data towards the Multimedia domain, said additional authentication data including at least one of
authentication type;
access information; and
authentication timestamp.

14. The user equipment of claim 10, wherein the means for processing the notification received from the Multimedia domain includes means for receiving and processing the indication of Implicit Authentication by the network that the implicit authentication is a final decision taken by the network and no explicit authentication can be carried out.

15. A method for authenticating a user equipment accessing a Multimedia domain through an access network, the method comprising the steps of:

first authenticating the user equipment with a subscriber server in the access network, said subscriber server authorizing said user equipment to gain access to said access network wherein said subscriber server storing authentication data associated with said user equipment;

registering the user equipment into the Multimedia domain, further comprising the steps of:

deciding whether an implicit authentication between the user and a service call session control function (S-CSCF) of the Multimedia domain can take place based on the first authentication of the user equipment in the access network; and in response to a decision that said implicit authentication can take place, instructing the S-CSCF in the multimedia domain that implicit authentication of the user equipment can take place by re-using said authentication data stored in the subscriber server and to not perform any explicit authentication between said S-CSCF and said user equipment; otherwise, in response to a decision that said implicit authentication cannot take place, issuing an authentication challenge message from the S-CSCF to the user equipment to perform an explicit authentication.

16. The method of claim 15, further comprising a step of notifying from the Multimedia domain to the user equipment that implicit authentication of the user equipment for accessing the Multimedia domain can be carried out.

17. The method of claim 15, wherein the step of deciding that the implicit authentication can take place includes a step of determining the potential security of the signalling path to access the Multimedia domain through said access network.

18. The method of claim 15, wherein the step of deciding that the implicit authentication can take place includes a step of proposing from the user equipment towards the Multimedia domain an implicit authentication to be carried out between said user equipment and Multimedia domain.

19. The method of claim 15, wherein the step of instructing the S-CSCF that the implicit authentication can take place includes a step of indicating that the Implicit Authentication is a final decision taken by the network and no explicit authentication can be carried out.

20. The method of claim 15, wherein the step of instructing the S-CSCF that the implicit authentication can take place includes a step of indicating that the final decision is on the user equipment which can force an explicit authentication.

21. The method of claim 20, further comprising a step of confirming from the user equipment acceptance of the implicit authentication proposed by the network.

22. The method of claim 21, further comprising a step of indicating to the S-CSCF in charge of authenticating the user equipment in the Multimedia domain that the user equipment has confirmed the implicit authentication.

23. A service call session control function (S-CSCF) in charge of authenticating a user equipment in the Multimedia domain when the user equipment accesses thereto through an access network where said user equipment had been previously authenticated within the access network, the serving entity comprising:
 means for receiving and processing instructions originating from a subscriber server within said access network, wherein said subscriber server for performing said previous authentication of said user equipment for gaining access to said access network and for storing authentication data associated with said user equipment, said instructions indicating whether an implicit authentication can take place based on the previous authentication of the user equipment by the access network and by re-using said authentication data stored in the subscriber server; and
 in response to said instruction to perform said implicit authentication, means for notifying the user equipment that an implicit authentication of the user equipment for accessing the Multimedia domain can by carried out by the network and to not perform any explicit authentication between said S-CSCF and said user equipment; otherwise,
 in response to said instruction that no implicit authentication can be performed, means for issuing an authentication challenge message from the S-CSCF to the user equipment to perform an explicit authentication.

24. The S-CSCF of claim 23, also comprising means for receiving an indication originated from the user equipment to confirm acceptance of the implicit authentication proposed by the network.

25. The S-CSCF of claim 23, further comprising means for receiving an indication originating from the device for Multimedia authentication of the user equipment indicating that the user equipment has confirmed the implicit authentication.

26. The S-CSCF of claim 25, further comprising means for checking the matching of additional authentication data respectively received from the device for Multimedia authentication of the user equipment and from the user equipment for providing an extra security support.

27. The S-CSCF of claim 26, wherein said additional authentication data include at least one of
 authentication type;
 access information; and
 authentication timestamp.

28. The S-CSCF of claim 23, wherein the means for notifying the user equipment that the implicit authentication can by carried out by the network includes means for indicating to the user equipment that the implicit authentication is a final decision taken by the network and no explicit authentication can be carried out.

* * * * *

UNITED STATES PATENT AND TRADEMARK OFFICE
CERTIFICATE OF CORRECTION

| | | |
|---|---|---|
| PATENT NO. | : 7,836,487 B2 | Page 1 of 1 |
| APPLICATION NO. | : 10/595110 | |
| DATED | : November 16, 2010 | |
| INVENTOR(S) | : Walker Pina et al. | |

It is certified that error appears in the above-identified patent and that said Letters Patent is hereby corrected as shown below:

On the Title Page, in Item (56), under "OTHER PUBLICATIONS", in Column 2, Line 4, delete "/htm]-info" and insert -- /html-info --, therefor.

In Column 1, Line 9, delete "Access" and insert -- access --, therefor.

In Column 1, Line 48, delete "Access" and insert -- access --, therefor.

In Column 3, Line 42, delete "can by" and insert -- can be --, therefor.

In Column 4, Line 44, delete "can by" and insert -- can be --, therefor.

In Column 5, Line 10, delete "can by" and insert -- can be --, therefor.

In Column 5, Line 13, delete "can by" and insert -- can be --, therefor.

In Column 5, Line 47, delete "can by" and insert -- can be --, therefor.

In Column 5, Line 53, delete "can by" and insert -- can be --, therefor.

In Column 6, Line 7, delete "can by" and insert -- can be --, therefor.

In Column 13, Line 64, delete "GRPS" and insert -- GPRS --, therefor.

In Column 15, Line 2, in Claim 1, delete "equipment:" and insert -- equipment; --, therefor.

In Column 15, Lines 2-3, in Claim 1, delete "otherwise" and insert -- otherwise, --, therefor.

In Column 18, Line 4, in Claim 23, delete "can by" and insert -- can be --, therefor.

In Column 18, Lines 31-32, in Claim 28, delete "can by" and insert -- can be --, therefor.

Signed and Sealed this
Eighteenth Day of January, 2011

David J. Kappos
*Director of the United States Patent and Trademark Office*